(12) United States Patent
Lin

(10) Patent No.: US 10,717,807 B1
(45) Date of Patent: Jul. 21, 2020

(54) EPOXY RESIN COMPOSITION AND ARTICLE MADE THEREFROM

(71) Applicant: Elite Material Co., Ltd., Taoyuan (TW)

(72) Inventor: Yu-Te Lin, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 0 days.

(21) Appl. No.: 16/383,913

(22) Filed: Apr. 15, 2019

(30) Foreign Application Priority Data

Mar. 11, 2019 (TW) .............................. 108107945 A

(51) Int. Cl.
*C08G 59/42* (2006.01)
*C08G 59/40* (2006.01)
*C08L 63/00* (2006.01)
*C08J 5/24* (2006.01)

(52) U.S. Cl.
CPC ..... *C08G 59/4284* (2013.01); *C08G 59/4028* (2013.01); *C08G 59/4207* (2013.01); *C08G 59/4276* (2013.01); *C08L 63/00* (2013.01); *C08J 5/24* (2013.01); *C08L 2203/16* (2013.01); *C08L 2203/20* (2013.01); *C08L 2312/08* (2013.01)

(58) Field of Classification Search
CPC .................................................. C08G 59/4284
See application file for complete search history.

(56) References Cited

U.S. PATENT DOCUMENTS

| | | | | |
|---|---|---|---|---|
| 6,489,405 | B1* | 12/2002 | Beisele | ................ C08G 59/12 |
| | | | | 428/413 |
| 2012/0001350 | A1* | 1/2012 | Wada | .................. H01L 21/565 |
| | | | | 257/793 |
| 2017/0226276 | A1* | 8/2017 | Nii | ......................... C08G 59/42 |
| 2017/0298218 | A1* | 10/2017 | Li | ......................... B32B 15/092 |

\* cited by examiner

*Primary Examiner* — Megan McCulley
(74) *Attorney, Agent, or Firm* — Muncy, Geissler, Olds & Lowe, P.C.

(57) ABSTRACT

Disclosed are an epoxy resin composition and an article made therefrom, the epoxy resin composition comprising an epoxy resin and a co-hardener, wherein: relative to the epoxy resin having a total equivalent of epoxy group of 1, the co-hardener comprises: (A) an acid anhydride having a total equivalent of acid anhydride group of 0.044-0.183; (B) a polyester having a total equivalent of ester group of 0.120-0.550; (C) a first phenolic resin having an equivalent of hydroxyl group of 0.092-0.550; and (D) a second phenolic resin having an equivalent of hydroxyl group of 0.143-0.592; and a sum of equivalent of functional groups of the co-hardener is 0.84-1.11.

10 Claims, 3 Drawing Sheets

EPOXY RESIN COMPOSITION AND ARTICLE MADE THEREFROM

CROSS-REFERENCE TO RELATED APPLICATION

This application claims the priority benefits of Taiwan Patent Application No. 108107945, filed on Mar. 11, 2019. The entirety the above-mentioned patent application is hereby incorporated by reference herein and made a part of this specification.

BACKGROUND

1. Field of the Disclosure

The present disclosure relates to an epoxy resin composition which is useful for preparing a resin film, a prepreg, a laminate or a printed circuit board.

2. Description of Related Art

Conventionally, a single phenolic resin or a single amine curing agent has been used as the curing agent for an epoxy resin, and the epoxy resin composition comprising an epoxy resin and a curing agent is useful for making prepregs and laminates which are base materials for fabricating a printed circuit board (abbreviated as "circuit board"). The advancement of technology has made it possible to fabricate a printed circuit board with up to 10 to 20 layers. However, prepregs and laminates made from conventional epoxy resin compositions have a problem of variation caused by dimensional change of the materials during multiple lamination processes, such that laminates subjected to multiple lamination processes have high variation in X-axis and Y-axis dimensional stability (i.e., poor interlayer alignment) and/or high warpage variation in Z-axis, resulting in poor alignment in subsequent lamination processes and products with unacceptable quality which are discarded due to the presence of defects. Therefore, conventional laminates fail to meet high dimensional stability and low average warpage ratio at the same time.

In addition, during the fabrication of multi-layer boards, resin filling property of prepregs is another important factor determining the quality and yield rate of circuit board products. Excellent resin filling property provides excellent insulation property to the insulation layers of circuit boards; on the contrary, circuit boards with poor resin filling property contain voids formed in the insulation layers, and voids may cause delamination of circuit boards during the reflow process.

On the other hand, peeling strength between an insulation layer and a copper foil layer of circuit boards is another important property of the circuit boards. Circuit boards with low peeling strength tend to cause failure or malfunctioning due to peeling off of surface traces or short circuit after collision.

SUMMARY

It is desirable to overcome the problems of prior arts, particularly one or more above-mentioned technical problems facing conventional materials. It is a primary object of the present disclosure to provide an epoxy resin composition and an article made therefrom which may overcome at least one of the above-mentioned technical problems.

To achieve the above-mentioned object, the present disclosure provides an epoxy resin composition comprising an epoxy resin and a co-hardener, wherein: relative to the epoxy resin having a total equivalent of epoxy group (i.e., epoxide group) of 1, the co-hardener comprises: (A) an acid anhydride having a total equivalent of acid anhydride group of 0.044-0.183; (B) a polyester having a total equivalent of ester group of 0.120-0.550; (C) a first phenolic resin having an equivalent of hydroxyl group of 0.092-0.550; and (D) a second phenolic resin having an equivalent of hydroxyl group of 0.143-0.592; and a sum of equivalent of functional groups of the co-hardener is 0.84-1.11.

The co-hardener used herein refers to two or more curing agents of different structures contained in the epoxy resin composition. Unless otherwise specified, a curing agent refers to any component or ingredient capable of participating in the crosslinking reaction of the epoxy resin composition.

For example, the co-hardener refers to a combination of curing agents. For example, the co-hardener disclosed herein may refer to four or more curing agents of different structures contained in the epoxy resin composition; for example, the co-hardener disclosed herein may comprise five curing agents, six curing agents, seven curing agents or eight curing agents, but not limited thereto.

For example, in the epoxy resin composition, the epoxy resin and the co-hardener are both reactive resins, which have reactive functional groups capable of reacting with the same resins or other resins to form crosslinking.

As used herein, the equivalent weight of a functional group represents the part by weight required for a substance for 1 equivalent and has a unit of part by weight per equivalent (pbw/equiv), such as but not limited to gram/equivalent. The equivalent for 1 part by weight of a reactive resin is equal to 1 part by weight divided by its equivalent weight. For example, if a substance has an equivalent weight of 50 parts by weight per equivalent, then 1 part by weight of the substance is equal to 0.02 equivalent.

Different epoxy resins usually have different equivalent weight of epoxy group, and equivalent weight of epoxy group of an epoxy resin is determined by the structure and number of epoxy groups of the epoxy resin. The equivalent weight of epoxy group of any epoxy resin is available from the supplier of the epoxy resin. Similarly, different curing agents usually have different equivalent weight of reactive functional group, and equivalent weight of reactive functional group of a curing agent is determined by the structure and number of reactive functional groups of the curing agent. The equivalent weight of reactive functional group of any curing agent is available from the supplier of the curing agent.

In one embodiment, the epoxy resin composition disclosed herein may optionally further comprise: amine curing agent, maleimide resin, acrylate resin, benzoxazine resin, cyanate ester resin, polyolefin resin, vinyl-containing polyphenylene ether resin, triallyl isocyanurate resin, triallyl cyanurate resin or a combination thereof, but not limited thereto.

In one embodiment, the epoxy resin composition disclosed herein may optionally further comprise: flame retardant, inorganic filler, curing accelerator, solvent, toughening agent, silane coupling agent or a combination thereof, but not limited thereto.

Also disclosed herein is an article made from the aforesaid epoxy resin composition, comprising a resin film, a prepreg, a laminate or a printed circuit board. Preferably, the aforesaid article achieves one or more desirable properties such as in prepreg appearance, inner resin flow, resin filling property in open area, dimensional stability, average warpage ratio and copper foil peeling strength.

Articles made from the epoxy resin composition disclosed herein have one, more or all of the following properties:
1. absent of void of greater than 1 mm in diameter by visual inspection;
2. having an inner resin flow after lamination of greater than or equal to 4.5 mm;
3. absent of void of greater than 1 mm in diameter in an open area after resin filling;
4. having a dimensional stability after lamination represented by deformation Cpk of greater than or equal to 1.20;
5. having an average warpage ratio as measured by reference to IPC-TM-650 2.4.22 of less than or equal to 0.60%; and
6. having a copper foil peeling strength as measured by reference to IPC-TM-650 2.4.8 of greater than or equal to 6.0 lb/in.

DESCRIPTION OF THE EMBODIMENTS

Figure 1:
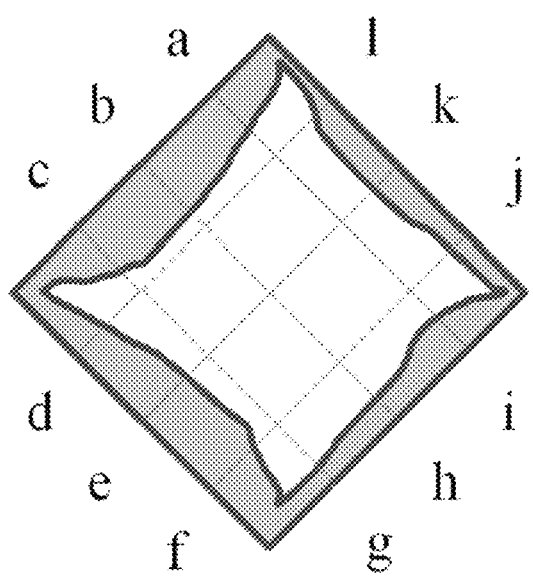
FIG. 1 illustrates a sample for inner resin flow test.

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$" and Y is described as being "selected from a group consisting of $Y_1$, $Y_2$ and $Y_3$," the disclosure of any combination of X is $X_1$ and/or $X_2$ and/or $X_3$ and Y is $Y_1$ and/or $Y_2$ and/or $Y_3$.

The following embodiments and examples are illustrative in nature and are not intended to limit the present disclosure and its application. In addition, the present disclosure is not bound by any theory described in the background and summary above or the following embodiments or examples.

As described above, it is a primary object of the present disclosure to provide an epoxy resin composition, comprising an epoxy resin and a co-hardener, wherein: relative to the epoxy resin having a total equivalent of epoxy group of 1, the co-hardener comprises: (A) an acid anhydride having a total equivalent of acid anhydride group of 0.044-0.183; (B) a polyester having a total equivalent of ester group of 0.120-0.550; (C) a first phenolic resin having an equivalent of hydroxyl group of 0.092-0.550; and (D) a second phenolic resin having an equivalent of hydroxyl group of 0.143-0.592; and a sum of equivalent of functional groups of the co-hardener is 0.84-1.11.

For example, the equivalent weight of epoxy group is obtained from the type of epoxy resin used. The epoxy resin may comprise any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional novolac epoxy resin, dicyclopentadiene-containing (DCPD-containing) epoxy resin, phosphorus-containing epoxy resin, p-xylene epoxy resin, naphthalene-containing epoxy resin (e.g., naphthol epoxy resin), benzofuran epoxy resin, isocyanate-modified epoxy resin, or a combination thereof, but not limited thereto.

The novolac epoxy resin may comprise phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin.

The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be any one or more selected from DOPO-containing phenolic novolac epoxy resin, DOPO-containing cresol novolac epoxy resin and DOPO-containing bisphenol-A novolac epoxy resin. The DOPO-HQ epoxy resin may be any one or more selected from DOPO-HQ-containing phenolic novolac epoxy resin, DOPO-HQ-containing cresol novolac epoxy resin and DOPO-HQ-containing bisphenol-A novolac epoxy resin.

For example, in the epoxy resin composition of the present disclosure, the epoxy resin having a total equivalent of epoxy group of 1 may comprise at least one epoxy resin, such as but not limited to one to five epoxy resins or one to ten epoxy resins.

Unless otherwise specified, according to the present disclosure, a resin encompasses a compound, a mixture or a combination thereof. A compound refers to a chemical substance formed by two or more elements bonded with chemical bonds and may be present as a monomer, a polymer, etc., but not limited thereto. A polymer refers to a chemical substance formed by a compound via polymerization and may comprise a homopolymer, but not limited thereto. As used herein, the term "polymer" includes but is not limited to an oligomer. An oligomer refers to a polymer with 2-20, typically 2-5, repeating units. A mixture comprises two or more compounds or a copolymer formed by polymerization of two or more compounds.

For example, the equivalent weight of acid anhydride group is obtained from the type of acid anhydride used. The acid anhydride may comprise a mono-functional acid anhydride, a bifunctional acid anhydride, a trifunctional acid anhydride, a tetrafunctional acid anhydride or a styrene maleic anhydride, but not limited thereto. The mono-functional acid anhydride, bifunctional acid anhydride, trifunctional acid anhydride or tetrafunctional acid anhydride may comprise any mono-functional acid anhydride, bifunctional acid anhydride, trifunctional acid anhydride or tetrafunctional acid anhydride known in the field to which this disclosure pertains. The styrene maleic anhydride may comprise any styrene maleic anhydride known in the field to which this disclosure pertains, wherein the molar ratio of styrene (S) to maleic anhydride (MA) may be 1/1, 2/1, 3/1, 4/1, 6/1, 8/1 or 12/1. Examples include styrene maleic anhydride copolymers such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope, but not limited thereto.

In the epoxy resin composition of the present disclosure, unless otherwise specified, relative to the epoxy resin having a total equivalent of epoxy group of 1, the total equivalent of acid anhydride group of the acid anhydride is 0.044-0.183, such as 0.045-0.182, but not limited thereto.

For example, equivalent weight of ester group is obtained from the type of polyester used. The polyester may be any polyester resin known in the field to which this disclosure pertains. Examples include but are not limited to a dicyclopentadiene-containing polyester resin, a naphthalene-containing polyester resin and a phosphorus-containing polyester resin. The phosphorus-containing polyester resin may comprise a DOPO-containing polyester resin and a DPPO-containing polyester resin. Examples of the polyester include, but not limited to, HPC-8000 or HPC-8150 available from D.I.C. Corporation.

In the epoxy resin composition of the present disclosure, unless otherwise specified, relative to the epoxy resin having a total equivalent of epoxy group of 1, the total equivalent of ester group of the polyester is 0.120-0.550, such as 0.120-0.549, but not limited thereto.

For example, the equivalent weight of hydroxyl group of the first phenolic resin and the equivalent weight of hydroxyl group of the second phenolic resin are respectively obtained from the types of phenolic resin used. The phenolic resin may comprise any phenolic resin known in the field to which this disclosure pertains, examples including but not limited to phenol resin, novolac resin, phenoxy resin, hydroxyl-containing polyphenylene ether, phosphorus-containing phenolic resin, phosphorus-containing novolac resin or a combination thereof, but not limited thereto. The novolac resin may comprise phenol novolac resin, naphthol novolac resin, biphenyl novolac resin or a combination thereof, but not limited thereto. The phenol resin may comprise tetrafunctional phenolic resin, dicyclopentadiene phenolic resin or a combination thereof, but not limited thereto. The phosphorus-containing phenolic resin may comprise DOPO-containing phenolic resin, DPPO-containing phenolic resin, DOPO-HQ-containing phenolic resin, DPPO-HQ-containing phenolic resin or a combination thereof, but not limited thereto. The phosphorus-containing novolac resin may comprise DOPO-containing phenol novolac resin, DOPO-containing bisphenol A novolac resin, DOPO-containing bisphenol F novolac resin, DPPO-containing phenol novolac resin, DPPO-containing bisphenol A novolac resin, DPPO-containing bisphenol F novolac resin, DOPO-HQ-containing bisphenol A novolac resin, DOPO-HQ-containing bisphenol F novolac resin, DPPO-HQ-containing bisphenol A novolac resin, DPPO-HQ-containing bisphenol F novolac resin or a combination thereof, but not limited thereto. Examples of the phenoxy resin include but are not limited to those sold under the tradename PKHA, PKHB, PKHB+, PKHC, PKHH, PKHJ, PKFE, PKHP-200 or PKHW-34 from Gabriel Performance Products and YP50S sold by Nippon Steel & Sumikin Chemical. The hydroxyl-containing polyphenylene ether may comprise SA-90 hydroxyl-containing polyphenylene ether resin available from Sabic, but not limited thereto.

In the epoxy resin composition of the present disclosure, unless otherwise specified, relative to the epoxy resin having a total equivalent of epoxy group of 1, the equivalent of hydroxyl group of the first phenolic resin is 0.092-0.550, such as 0.092-0.549, but not limited thereto.

In the epoxy resin composition of the present disclosure, unless otherwise specified, relative to the epoxy resin having a total equivalent of epoxy group of 1, the equivalent of hydroxyl group of the second phenolic resin is 0.143-0.592, such as 0.143-0.591, but not limited thereto.

In addition, in the epoxy resin composition of the present disclosure, unless otherwise specified, relative to the epoxy resin having a total equivalent of epoxy group of 1, the sum of equivalent of functional groups of the co-hardener is 0.84-1.11, such as 0.85-1.10.

The epoxy resin composition disclosed herein may optionally further comprise amine curing agent, maleimide resin, acrylate resin, benzoxazine resin, cyanate ester resin, polyolefin resin, vinyl-containing polyphenylene ether resin, triallyl isocyanurate resin, triallyl cyanurate resin or a combination thereof, but not limited thereto.

For example, the amine curing agent has an amino group and a corresponding equivalent weight of amino group. The equivalent weight of amino group is obtained from the type of amine curing agent used. The amine curing agent may be any amine curing agent known in the field to which this disclosure pertains. Examples include but are not limited to any one or a combination of diamino diphenyl sulfone, diamino diphenyl methane, diamino diphenyl ether, diamino diphenyl sulfide and dicyandiamide.

For example, the maleimide resin has a vinyl group and a corresponding equivalent weight of vinyl group. The equivalent weight of vinyl group is obtained from the type of maleimide resin used. The maleimide resin refers to a compound or a mixture containing at least one maleimide group. Unless otherwise specified, the maleimide resin used in the present disclosure is not particularly limited and may include any one or more maleimide resins used for preparing a resin film, a prepreg, a laminate or a printed circuit board. Examples include but are not limited to 4,4'-diphenylmethane bismaleimide, oligomer of phenylmethane maleimide (a.k.a. polyphenylmethane maleimide), m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl)hexane, N-2,3-xylylmaleimide, N-2,6-xylenemaleimide, N-phenyl maleimide, maleimide compound containing an aliphatic long-chain structure or a combination thereof. In addition, unless otherwise specified, the aforesaid maleimide resin of the present disclosure may comprise a prepolymer thereof, such as a prepolymer of diallyl compound and maleimide compound, a prepolymer of diamine and maleimide compound, a prepolymer of multi-functional amine and maleimide compound or a prepolymer of acid phenol compound and maleimide compound, but not limited thereto.

For example, the maleimide resin may include products such as BMI-1000, BMI-1000H, BMI-1100, BMI-1100H, BMI-2000, BMI-2300, BMI-3000, BMI-3000H, BMI-4000H, BMI-5000, BMI-5100, BM-7000 and BMI-7000H available from Daiwakasei Co., Ltd., or products such as BMI-70 and BMI-80 available from K.I Chemical Industry Co., Ltd.

For example, the maleimide resin containing an aliphatic long-chain structure may include products such as BMI-689, BMI-1400, BMI-1500, BMI-1700, BMI-2500, BMI-3000, BMI-5000 and BMI-6000 sold by Designer Molecules Inc.

For example, the acrylate resin has an acrylate group and a corresponding equivalent weight of acrylate group. The equivalent weight of acrylate group is obtained from the type of acrylate resin used. The acrylate resin may comprise a mono-functional acrylate resin, a bifunctional acrylate resin, or a trifunctional acrylate resin, but not limited thereto. For example, the mono-functional acrylate resin may comprise, but not limited to, dodecyl methacrylate, octadecyl methacrylate, 2-phenoxyethyl methacrylate or a combination thereof. The bifunctional acrylate resin may comprise, but not limited to, tricyclodecane dimethanol diacrylate, 1,6-hexanediol diacrylate, 1,6-hexanediol dimethacrylate, 1,12-dodecanediol dimethacrylate or a combination thereof. The trifunctional acrylate resin may comprise trimethylolpropane trimethacrylate.

For example, the mono-functional acrylate resin may be a mono-functional long-chain alkyl acrylate sold by Sartomer under the tradenames SR313A, SR313B, SR313NS, SR324NS, SR335, and SR489D.

For example, the bifunctional acrylate resin may be a bifunctional acrylate sold by Sartomer under the tradenames SR-833S, SR-238NS, SR-239 and SR-262.

For example, the trifunctional acrylate resin may be a trifunctional acrylate sold by Sartomer under the tradename SR-350NS.

For example, the benzoxazine resin has a benzoxazine group and a corresponding equivalent weight of benzoxazine group. The equivalent weight of benzoxazine group is obtained from the type of benzoxazine resin used. The benzoxazine resin may be any benzoxazine resin known in the field to which this disclosure pertains. Examples include but are not limited to bisphenol A benzoxazine resin, bisphenol F benzoxazine resin, phenolphthalein benzoxazine resin, dicyclopentadiene benzoxazine resin, phosphorus-containing benzoxazine resin, dianiline benzoxazine resin, phenyl-modified benzoxazine resin, vinyl-modified benzoxazine resin, allyl-modified benzoxazine resin or a combination thereof. Commercially available products include LZ-8270 (phenolphthalein benzoxazine resin), LZ-8298 (phenolphthalein benzoxazine resin), LZ-8280 (bisphenol F benzoxazine resin) and LZ-8290 (bisphenol A benzoxazine resin) available from Huntsman, and KZH-5031 (vinyl-modified benzoxazine resin) and KZH-5032 (phenyl-modified benzoxazine resin) available from Kolon Industries Inc. The dianiline benzoxazine resin may be diaminodiphenylmethane benzoxazine resin, diaminodiphenyl ether benzoxazine resin, diaminodiphenyl sulfone benzoxazine resin, diaminodiphenyl sulfide benzoxazine resin or a combination thereof, but not limited thereto.

For example, the cyanate ester resin has a cyanate ester group and a corresponding equivalent weight of cyanate ester group. The equivalent weight of cyanate ester group is obtained from the type of cyanate ester resin used. The cyanate ester resin is not particularly limited and may be any cyanate ester resin with an Ar—O—C≡N structure, wherein Ar represents a substituted or unsubstituted aromatic group, novolac, bisphenol A, bisphenol A novolac, bisphenol F, bisphenol F novolac or phenolphthalein. The cyanate ester resin may be available under the tradenames Primaset PT-15, PT-30S, PT-60S, BA-200, BA-230S, BA-3000S, BTP-2500, BTP-6020S, DT-4000, DT-7000, ULL950S, HTL-300, CE-320, LVT-50, or LeCy sold by Lonza, but not limited thereto.

For example, the polyolefin resin has a vinyl group and a corresponding equivalent weight of vinyl group. The equivalent weight of vinyl group is obtained from the type of polyolefin resin used. The polyolefin resin may be any polyolefin resin known in the field to which this disclosure pertains, examples including but not limited to styrene-butadiene-divinylbenzene terpolymer, styrene-butadiene-maleic anhydride terpolymer, vinyl-polybutadiene-urethane oligomer, styrene butadiene copolymer, hydrogenated styrene butadiene copolymer, styrene isoprene copolymer, hydrogenated styrene isoprene copolymer, hydrogenated styrene-butadiene-divinylbenzene copolymer, polybutadiene (homopolymer of butadiene), maleic anhydride-butadiene copolymer, methyl styrene copolymer or a combination thereof.

For example, the vinyl-containing polyphenylene ether resin has a vinyl group and a corresponding equivalent weight of vinyl group. The equivalent weight of vinyl group is obtained from the type of vinyl-containing polyphenylene ether resin used. The vinyl-containing polyphenylene ether resin may be any vinyl-containing polyphenylene ether resin known in the field to which this disclosure pertains, wherein the vinyl-containing polyphenylene ether resin refers to a vinyl-terminated polyphenylene ether resin. Examples include but are not limited to vinylbenzyl-terminated polyphenylene ether resin (e.g., OPE-2st available from Mitsubishi Gas Chemical Co., Inc.), methacrylate-terminated polyphenylene ether resin (e.g., SA-9000 available from Sabic), vinylbenzyl-modified bisphenol A polyphenylene ether resin, vinyl-containing chain-extended polyphenylene ether resin or a combination thereof.

For example, the triallyl isocyanurate resin has an allyl group and a corresponding equivalent weight of allyl group. The equivalent weight of allyl group is obtained from the type of triallyl isocyanurate resin used, such as various triallyl isocyanurate resins known in the field to which this disclosure pertains.

For example, the triallyl cyanurate resin has an allyl group and a corresponding equivalent weight of allyl group. The equivalent weight of allyl group is obtained from the type of triallyl cyanurate resin used, such as various triallyl cyanurate resins known in the field to which this disclosure pertains.

In addition to the aforesaid components, the epoxy resin composition of the present disclosure may further optionally comprise flame retardant, inorganic filler, curing accelerator, solvent, toughening agent, silane coupling agent or a combination thereof, but not limited thereto.

The epoxy resin composition of the present disclosure may further contain a flame retardant to enhance the flame retardancy of products made from the epoxy resin composition. The flame retardant may be any flame retardant known in the field to which this disclosure pertains, examples including but not limited to any one, two or more selected from the following group: ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives or resins, DPPO (diphenylphosphine oxide) and its derivatives or resins, melamine cyanurate, tri-hydroxy ethyl isocyanurate and aluminium phosphinate (e.g., commercially available OP-930 and OP-935).

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO-containing phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) and DOPO-BPSN (DOPO-bisphenol S novolac).

The epoxy resin composition of the present disclosure may further contain an inorganic filler to enhance the dimensional stability of products made from the epoxy resin composition. The inorganic filler may be any inorganic filler known in the field to which this disclosure pertains, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride, calcined kaolin or a combination thereof. Moreover, the inorganic filler can be spherical, fibrous, plate-like, particulate, sheet-like or whisker-like in shape and can be optionally pre-treated by a silane coupling agent.

The epoxy resin composition of the present disclosure may further contain a curing accelerator to enhance the reactivity of the components in the epoxy resin composition. The curing accelerator (including curing initiator) may be any curing accelerator known in the field to which this disclosure pertains, examples including but not limited to catalysts such as a Lewis base, a Lewis acid or a combination thereof. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals. The curing initiator may comprise dicumyl peroxide, tert-butyl peroxybenzoate, dibenzoyl peroxide (BPO), 2,5-dimethyl-2,5-di(tert-butylperoxy)-3-hexyne, bis(tert-butylperoxyisopropyl)benzene or a combination thereof, but not limited thereto.

The epoxy resin composition of the present disclosure may further contain a solvent to adjust the viscosity of varnish formed therefrom. The solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

The epoxy resin composition of the present disclosure may further contain a toughening agent to enhance the toughness of products made from the epoxy resin composition. The toughening agent may comprise, but not limited to, rubber resin, carboxyl-terminated butadiene acrylonitrile rubber (CTBN rubber), core-shell rubber, or a combination thereof.

The epoxy resin composition of the present disclosure may further contain a silane coupling agent to promote dispersion of the inorganic filler. The silane coupling agent may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane.

Another object of the present disclosure is to provide an article made from the epoxy resin composition, such as a resin film, a prepreg, a laminate or a printed circuit board, but not limited thereto.

The article made from the epoxy resin composition may be a resin film prepared by coating the epoxy resin composition on a carrier and then heating and baking to semi-cure the epoxy resin composition. The carrier may comprise a polyethylene terephthalate film (PET film), a polyimide film (PI film), a copper foil or a resin-coated copper (RCC). For example, the epoxy resin composition may be selectively coated on a polyethylene terephthalate film (PET film), a polyimide film (PI film), a copper foil or a resin-coated copper (RCC), followed by heating and baking to semi-cure the epoxy resin composition to form the resin film.

The article made from the epoxy resin composition may be a prepreg, which comprises a reinforcement material and a layered structure disposed thereon. The prepreg is obtained by impregnating the reinforcement material in a varnish prepared from the epoxy resin composition followed by heating and baking to semi-cure the epoxy resin composition. The layered structure is formed by heating the epoxy resin composition at a high temperature to the B-stage. Suitable baking temperature for making the prepreg may be for example 80° C. to 170° C. For example, the reinforcement material may be any one of a fiber material, woven fabric, and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal resin woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

The article made from the epoxy resin composition may be a laminate, which comprises two metal foils and an insulation layer disposed between the metal foils, wherein the insulation layer is made by curing the epoxy resin composition at high temperature and high pressure to the C-stage, a suitable curing temperature being for example between 150° C. and 220° C. and preferably between 190° C. and 210° C. and a suitable curing time being 90 to 180 minutes and preferably 120 to 150 minutes. The insulation layer may be obtained by curing the aforesaid prepreg or resin film. The metal foil may comprise copper, aluminum, nickel, platinum, silver, gold or alloy thereof, such as a copper foil.

For example, the laminate may be a copper-clad laminate (CCL).

The laminate may be further processed by trace formation processes to provide a printed circuit board (a.k.a. circuit board).

Specifically, the epoxy resin compositions according to the present disclosure and articles made therefrom may achieve one, more or all of the following features:
1. absent of void of greater than 1 mm in diameter in a prepreg by visual inspection;
2. having an inner resin flow in a laminate after lamination of greater than or equal to 4.5 mm, such as between 4.6 mm and 5.2 mm;
3. absent of void of greater than 1 mm in diameter in an open area of a laminate after resin filling;
4. having a dimensional stability of a laminate after lamination represented by deformation Cpk of greater than or equal to 1.20, such as between 1.23 and 1.41;
5. having an average warpage ratio of a laminate as measured by reference to IPC-TM-650 2.4.22 of less than or equal to 0.60%, such as between 0.43% and 0.59%; and
6. having a copper foil peeling strength of a laminate as measured by reference to IPC-TM-650 2.4.8 of greater than or equal to 6.0 lb/in, such as between 6.0 lb/in and 6.5 lb/in.

Materials and reagents used in Preparation Examples, Examples and Comparative Examples disclosed herein are listed below:

NC-3000: biphenyl epoxy resin, solid content of 100%, having an equivalent weight of epoxy group of 280 pbw/equiv, available from Nippon Kayaku.

NPPN-260: dimethyl phenol novolac epoxy resin, solid content of 80%, having an equivalent weight of epoxy group of 200 pbw/equiv, available from Nan Ya Plastics Corporation.

N-740: phenol novolac epoxy resin, solid content of 80%, having an equivalent weight of epoxy group of 177 pbw/equiv, available from D.I.C. Corporation.

HP-7200: dicyclopentadiene-containing epoxy resin, solid content of 75%, having an equivalent weight of epoxy group of 275 pbw/equiv, available from D.I.C. Corporation.

HP-9500: naphthalene-containing epoxy resin, solid content of 75%, having an equivalent weight of epoxy group of 230 pbw/equiv, available from D.I.C. Corporation.

EF-30: styrene maleic anhydride, solid content of 100%, molar ratio of styrene to maleic anhydride of 3:1, having an equivalent weight of acid anhydride group of 306 pbw/equiv, available from Cray Valley.

EF-60: styrene maleic anhydride, solid content of 100%, molar ratio of styrene to maleic anhydride of 6:1, having an equivalent weight of acid anhydride group of 550 pbw/equiv, available from Cray Valley.

HPC-8000: dicyclopentadiene-containing polyester, solid content of 65%, having an equivalent weight of ester group of 230 pbw/equiv, available from D.I.C. Corporation.

HPC-8150: naphthalene-containing polyester, solid content of 60%, having an equivalent weight of ester group of 235 pbw/equiv, available from D.I.C. Corporation.

HPC-9500: naphthalene-containing phenolic resin, solid content of 100%, having an equivalent weight of hydroxyl group of 153 pbw/equiv, available from D.I.C. Corporation.

PD-9110: dicyclopentadiene-containing phenolic resin, solid content of 70%, having an equivalent weight of hydroxyl group of 190 pbw/equiv, available from Chang Chun Plastics Co., Ltd.

DDS: diamino diphenyl sulfone, solid content of 100%, having an equivalent weight of amino group of 62 pbw/equiv, available from Kingyorker Enterprise Co., Ltd.

BMI-2300: polyphenylmethane maleimide (with reactive vinyl group), solid content of 100%, having an equivalent weight of vinyl group of 180 pbw/equiv, available from Daiwakasei Industry Co., Ltd.

SA-9000: methacrylate-terminated polyphenylene ether, solid content of 100%, having an equivalent weight of vinyl group of 1300 pbw/equiv, available from Sabic.

OPE-2st 1200: vinylbenzyl-terminated polyphenylene ether, solid content of 100%, having an equivalent weight of vinyl group of 580 pbw/equiv, available from Mitsubishi Gas Chemical Co., Inc.

2PZ: 2-phenylimidazole, solid content of 100%, commercially available.

25B: peroxide, solid content of 100%, available from NOF Corporation.

525: MegaSil 525, fused silica, solid content of 100%, available from Sibelco.

Methyl ethyl ketone (MEK), commercially available.

Preparation of resin compositions in Examples and Comparative Examples

Example 1

150 parts by weight of methyl ethyl ketone, 100 parts by weight of NC-3000 and 16 parts by weight of EF-30 were added to a stirred tank and stirred at room temperature to fully dissolve NC-3000 and EF-30, followed by adding 24 parts by weight of HPC-8000, 19 parts by weight of HPC-9500 and 20 parts by weight of PD-9110 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition E1.

In the epoxy resin composition of Example E1, 100 parts by weight of NC-3000 have a total equivalent of epoxy group of 100 (pbw)/280 (pbw/equiv), i.e., 0.357 equivalent. Similarly, 24 parts by weight of HPC-8000 have an equivalent of ester group of 24 (pbw)/230 (pbw/equiv), i.e., 0.104 equivalent. Similarly, HPC-9500 has an equivalent of hydroxyl group of 0.124 equivalent; PD-9110 has an equivalent of hydroxyl group of 0.105 equivalent; and EF-30 has an equivalent of acid anhydride group of 0.052 equivalent. As such, in the epoxy resin composition of Example E1, the sum of equivalent of the co-hardener is 0.385 equivalent; therefore, in the epoxy resin composition of Example E1, the sum of equivalent of functional groups of the co-hardener divided by the total equivalent of epoxy group of the epoxy resin gives a ratio of 1.08. In other words, relative to the epoxy resin having a total equivalent of epoxy group of 1, the total equivalent of acid anhydride group is 0.146, the total equivalent of ester group is 0.291, the equivalent of hydroxyl group of the first phenolic resin is 0.347, and the equivalent of hydroxyl group of the second phenolic resin is 0.294.

Example 2

150 parts by weight of methyl ethyl ketone, 100 parts by weight of NC-3000 and 5 parts by weight of EF-30 were added to a stirred tank and stirred at room temperature to fully dissolve NC-3000 and EF-30, followed by adding 45 parts by weight of HPC-8000, 10 parts by weight of HPC-9500 and 15 parts by weight of PD-9110 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition E2.

Example 3

150 parts by weight of methyl ethyl ketone, 100 parts by weight of NC-3000 and 20 parts by weight of EF-30 were added to a stirred tank and stirred at room temperature to fully dissolve NC-3000 and EF-30, followed by adding 10 parts by weight of HPC-8000, 5 parts by weight of HPC-9500 and 40 parts by weight of PD-9110 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition E3.

Example 4

150 parts by weight of methyl ethyl ketone, 100 parts by weight of NC-3000 and 20 parts by weight of EF-30 were added to a stirred tank and stirred at room temperature to fully dissolve NC-3000 and EF-30, followed by adding 15 parts by weight of HPC-8000, 10 parts by weight of HPC-9500 and 30 parts by weight of PD-9110 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition E4.

Example 5

150 parts by weight of methyl ethyl ketone, 100 parts by weight of NC-3000 and 8 parts by weight of EF-30 were added to a stirred tank and stirred at room temperature to fully dissolve NC-3000 and EF-30, followed by adding 20 parts by weight of HPC-8000, 30 parts by weight of HPC-9500 and 10 parts by weight of PD-9110 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition E5.

Example 6

150 parts by weight of methyl ethyl ketone, 100 parts by weight of NC-3000 and 5 parts by weight of EF-30 were added to a stirred tank and stirred at room temperature to fully dissolve NC-3000 and EF-30, followed by adding 25 parts by weight of HPC-8000, 5 parts by weight of HPC-9500, 14 parts by weight of PD-9110 and 8 parts by weight of DDS to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition E6.

Example 7

70 parts by weight of methyl ethyl ketone, 35 parts by weight of NC-3000 and 15 parts by weight of EF-30 were added to a stirred tank and stirred at room temperature to fully dissolve NC-3000 and EF-30, followed by adding 10 parts by weight of NPPN-260, 5 parts by weight of N-740, 30 parts by weight of HP-7200, 20 parts by weight of HP-9500, 20 parts by weight of HPC-8000, 20 parts by weight of HPC-9500 and 20 parts by weight of PD-9110 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition E7.

Example 8

70 parts by weight of methyl ethyl ketone, 35 parts by weight of NC-3000, 9 parts by weight of EF-30 and 11 parts by weight of EF-60 were added to a stirred tank and stirred at room temperature to fully dissolve NC-3000, EF-30 and EF-60, followed by adding 10 parts by weight of NPPN-260, 5 parts by weight of N-740, 30 parts by weight of HP-7200, 20 parts by weight of HP-9500, 10 parts by weight of HPC-8000, 10 parts by weight of HPC-8150, 20 parts by weight of HPC-9500 and 20 parts by weight of PD-9110 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition E8.

Example 9

150 parts by weight of methyl ethyl ketone, 100 parts by weight of NC-3000 and 12 parts by weight of EF-30 were added to a stirred tank and stirred at room temperature to fully dissolve NC-3000 and EF-30, followed by adding 16 parts by weight of HPC-8000, 20 parts by weight of HPC-9500, 20 parts by weight of PD-9110 and 3 parts by weight of DDS to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition E9.

Example 10

150 parts by weight of methyl ethyl ketone, 100 parts by weight of NC-3000 and 12 parts by weight of EF-30 were added to a stirred tank and stirred at room temperature to fully dissolve NC-3000 and EF-30, followed by adding 14 parts by weight of HPC-8000, 15 parts by weight of HPC-9500 and 20 parts by weight of PD-9110 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition E10.

Example 11

70 parts by weight of methyl ethyl ketone, 25 parts by weight of NC-3000 and 15 parts by weight of EF-30 were added to a stirred tank and stirred at room temperature to fully dissolve NC-3000 and EF-30, followed by adding 10 parts by weight of NPPN-260, 10 parts by weight of N-740, 40 parts by weight of HP-7200, 15 parts by weight of HP-9500, 31 parts by weight of HPC-8000, 19 parts by weight of HPC-9500 and 11 parts by weight of PD-9110 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition E11.

Example 12

160 parts by weight of methyl ethyl ketone, 100 parts by weight of NC-3000, 2 parts by weight of BMI-2300, 5 parts by weight of OPE-2st 1200 and 15 parts by weight of EF-30 were added to a stirred tank and stirred at room temperature to fully dissolve NC-3000, BMI-2300, OPE-2st 1200 and EF-30, followed by adding 20 parts by weight of HPC-8000, 20 parts by weight of HPC-9500 and 20 parts by weight of PD-9110 to the stirred tank and stirring for an hour. Next, a proper amount of 2PZ pre-dissolved in a proper amount of methyl ethyl ketone and a proper amount of 25B pre-dissolved in a proper amount of methyl ethyl ketone were added and then stirred for an hour, followed by adding 130 parts by weight of 525 and stirring to fully disperse it so as to obtain a varnish of the epoxy resin composition E12.

Example 13

160 parts by weight of methyl ethyl ketone, 100 parts by weight of NC-3000, 8 parts by weight of SA-9000, 3 parts by weight of OPE-2st 1200 and 15 parts by weight of EF-30 were added to a stirred tank and stirred at room temperature to fully dissolve NC-3000, SA-9000, OPE-2st 1200 and EF-30, followed by adding 20 parts by weight of HPC-8000, 20 parts by weight of HPC-9500 and 20 parts by weight of PD-9110 to the stirred tank and stirring for an hour. Next, a proper amount of 2PZ pre-dissolved in a proper amount of methyl ethyl ketone and a proper amount of 25B pre-dissolved in a proper amount of methyl ethyl ketone were added and then stirred for an hour, followed by adding 130 parts by weight of 525 and stirring to fully disperse it so as to obtain a varnish of the epoxy resin composition E13.

Comparative Example 1

150 parts by weight of methyl ethyl ketone and 100 parts by weight of NC-3000 were added to a stirred tank and stirred at room temperature to fully dissolve NC-3000, followed by adding 15 parts by weight of HPC-8000, 10 parts by weight of HPC-9500 and 40 parts by weight of PD-9110 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition C1.

Comparative Example 2

150 parts by weight of methyl ethyl ketone and 100 parts by weight of NC-3000 were added to a stirred tank and stirred at room temperature to fully dissolve NC-3000, followed by adding 15 parts by weight of HPC-8000, 25 parts by weight of HPC-9500 and 30 parts by weight of PD-9110 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition C2.

Comparative Example 3

150 parts by weight of methyl ethyl ketone, 100 parts by weight of NC-3000 and 50 parts by weight of EF-30 were added to a stirred tank and stirred at room temperature to fully dissolve NC-3000 and EF-30, followed by adding 10 parts by weight of HPC-9500 and 14 parts by weight of PD-9110 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition C3.

Comparative Example 4

150 parts by weight of methyl ethyl ketone, 100 parts by weight of NC-3000 and 40 parts by weight of EF-30 were added to a stirred tank and stirred at room temperature to fully dissolve NC-3000 and EF-30, followed by adding 15 parts by weight of HPC-9500 and 30 parts by weight of PD-9110 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition C4.

Comparative Example 5

150 parts by weight of methyl ethyl ketone, 100 parts by weight of NC-3000 and 20 parts by weight of EF-30 were added to a stirred tank and stirred at room temperature to fully dissolve NC-3000 and EF-30, followed by adding 15 parts by weight of HPC-8000 and 30 parts by weight of PD-9110 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition C5.

Comparative Example 6

150 parts by weight of methyl ethyl ketone, 100 parts by weight of NC-3000 and 38 parts by weight of EF-30 were added to a stirred tank and stirred at room temperature to fully dissolve NC-3000 and EF-30, followed by adding 30 parts by weight of HPC-8000 and 25 parts by weight of PD-9110 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition C6.

Comparative Example 7

150 parts by weight of methyl ethyl ketone, 100 parts by weight of NC-3000 and 10 parts by weight of EF-30 were added to a stirred tank and stirred at room temperature to fully dissolve NC-3000 and EF-30, followed by adding 15 parts by weight of HPC-8000 and 20 parts by weight of HPC-9500 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition C7.

Comparative Example 8

150 parts by weight of methyl ethyl ketone, 100 parts by weight of NC-3000 and 18 parts by weight of EF-30 were added to a stirred tank and stirred at room temperature to fully dissolve NC-3000 and EF-30, followed by adding 30 parts by weight of HPC-8000 and 30 parts by weight of HPC-9500 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition C8.

Comparative Example 9

150 parts by weight of methyl ethyl ketone, 100 parts by weight of NC-3000 and 50 parts by weight of EF-30 were added to a stirred tank and stirred at room temperature to fully dissolve NC-3000 and EF-30, followed by adding 34 parts by weight of HPC-9500 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition C9.

Comparative Example 10

150 parts by weight of methyl ethyl ketone and 100 parts by weight of NC-3000 were added to a stirred tank and stirred at room temperature to fully dissolve NC-3000, followed by adding 40 parts by weight of HPC-8000 and 40 parts by weight of PD-9110 to the stirred tank and stirring for an hour. Next, a proper amount of 2PZ pre-dissolved in a proper amount of methyl ethyl ketone was added and then stirred for an hour, followed by adding 100 parts by weight of 525 and stirring to fully disperse it so as to obtain a varnish of the epoxy resin composition C10.

In each epoxy resin composition of Examples E1 to E13 and Comparative Examples C1 to C10, the equivalent of functional groups of the co-hardener, the sum of equivalent of functional groups of the co-hardener, the total equivalent of epoxy group of the epoxy resin and the ratio of the sum of equivalent of functional groups of the co-hardener to the total equivalent of epoxy group of the epoxy resin can be observed from Table 1 to Table 5.

In addition, samples (specimens) were prepared as described below and tested and analyzed under specified conditions.

Prepreg

Epoxy resin compositions from Examples (E1 to E13) and Comparative Examples (C1 to C10) were respectively loaded into an impregnation tank, and then a fiberglass fabric (e.g., 2116 E-glass fiber fabric) was passed through the impregnation tank to adhere the epoxy resin composition on the fiberglass fabric, followed by heating at 150° C. to 170° C. to the semi-cured state (B-Stage) to obtain a prepreg (resin content of about 52%).

Copper-Clad Laminate (Obtained by Laminating Five Prepregs)

Two 18 μm high temperature elongation (HTE) copper foils and five prepregs made from each epoxy resin composition (using 2116 E-glass fiber fabrics) were prepared. Each prepreg has a resin content of about 52%. A copper foil, five prepregs and a copper foil were superimposed in such order and then subject to a vacuum condition for lamination at 200° C. for 2 hours to form each copper-clad laminate sample. Insulation layers were formed by curing (C-stage) five sheets of superimposed prepreg between the two copper foils, and the resin content of the insulation layers is about 52%.

For each sample, test items and test methods are described below.

Prepreg Appearance

The samples were observed with naked eyes. A prepreg sample made from each epoxy resin composition was designated as "pass" if no void of greater than 1 mm in diameter was observed from its appearance to indicate that the sample passed the test. In contrast, if the prepreg sample contained at least one void of greater than 1 mm in diameter, it was designated as "fail" to indicate that the sample did not pass the test.

Inner Resin Flow (Resin Flow in the Laminate)

First, an EM-827 copper-containing laminate was used as a copper-containing core (available from Elite Material Co., Ltd., using 7628 E-glass fiber fabric and 1-ounce HTE copper foil), which had a thickness of 28 mil. Then the surface copper foil of the copper-containing core was subject to a conventional brown oxidation process to obtain a brown oxide treated core.

A prepreg (using 1067 E-glass fiber fabric, resin content of about 71%, 2.5 mil in thickness, 17 inch*15 inch in size) prepared from each Example (E1 to E13) and each Comparative Example (C1 to C10) and a brown oxide treated core (28 mil in thickness, 18 inch*16 inch in size) were prepared, wherein the center of the prepreg was a 4 inch*4 inch rhombus opening formed by a conventional punching machine. A piece of 0.5-ounce HTE copper foil (in reverse position, i.e., in contact with the prepreg with its smooth surface), a prepreg and a brown oxide treated core were superimposed in such order, followed by lamination and curing for 2 hours in vacuum at high temperature (200° C.) and high pressure (360 psi) to obtain a copper-containing multi-layer board. The surface copper foil of the copper-containing multi-layer board was removed to obtain a sample for inner resin flow test. Each side of the 4 inch*4 inch rhombus shape of the sample for inner resin flow test was divided into four equal sections, as illustrated in FIG. 1, and the resin flow (i.e., vertical distance of resin flow) of each of the twelve points from a to 1 in FIG. 1 was measured to calculate the average of resin flow at the twelve points and to provide the inner resin flow (as an average) represented in mm. A difference in inner resin flow of 1 mm or greater represents a significant difference.

Resin Filling Property in Open Area (15 mm*20 mm in Size)

A core was prepared as follows: a prepreg (using 1078 E-glass fiber fabric, resin content of about 64%) prepared from each Example (E1 to E13) and each Comparative Example (C1 to C10) was superimposed on both sides with a piece of 0.5-ounce HTE copper foil, followed by lamination and curing for 2 hours in vacuum at high temperature (200° C.) and high pressure (360 psi) to obtain a copper-containing core.

The copper-containing core was subject to conventional inner layer trace processes according to the Gerber Format Specification. First, the copper-containing core was treated by surface roughening on the copper foils by grinding and micro-etching, and then a photoresist dry film was tightly attached to the copper-containing core with proper temperature and pressure conditions. The core attached with the photoresist dry film was exposed in a UV exposure machine, during which the photoresist performed polymerization after UV radiation on the transparent area of the artwork (the dry film at the area was preserved as etching resist in the subsequent development and copper etching steps), so as to transfer the trace image on the artwork to the photoresist dry film. The protective membrane on the film was torn down, and the area not subject to radiation on the film was removed by a sodium bicarbonate solution, followed by etching off the exposed copper foil with a mixture solution of hydrochloric acid and hydrogen peroxide so as to form traces and an open area. Then a sodium hydroxide solution was used to wash off the photoresist dry film to obtain an inner layer wiring board. The inner layer wiring board was subject to a brown oxidation process to obtain a brown oxide treated inner layer wiring board, which had an insulation layer of 2.5 mil in thickness.

A prepreg (prepared from each Example E1 to E13 and each Comparative Example C1 to C10 using 1027 E-glass fiber fabric, resin content of about 69%, 1.5 mil in thickness) was superimposed on both sides of the brown oxide treated inner layer wiring board, and the other side of each prepreg opposite to the brown oxide treated inner layer wiring board was covered with a piece of 0.5-ounce HTE copper foil, followed by lamination and curing for 2 hours in vacuum at high temperature (200° C.) and high pressure (360 psi) to obtain a copper-containing multi-layer board. The copper foils on the copper-containing multi-layer board were removed such as by etching to obtain a sample for the resin filling property in open area test. A 10× optical microscope was used to observe the open area (15 mm*20 mm in size) of the sample for the resin filling property in open area test to determine the presence of void (a.k.a. "bubble") of greater than 1 mm in diameter in the open area. The presence of void will cause delamination of a wiring board in the subsequent high temperature processes. None represents absence of void (designated as "OK"), Moderate (designated as "*") represents the presence of 1 to 9 voids, and Serious (designated as "**") represents the presence of 10 or more voids in the open area.

Dimensional Stability (Deformation Cpk)

A core was prepared as follows: a prepreg prepared from each Example E1 to E13 and each Comparative Example C1 to C10 (using 1078 E-glass fiber fabric, resin content of about 64%) was superimposed on both sides with a piece of 0.5-ounce HTE copper foil, followed by lamination and curing for 2 hours in vacuum at high temperature (200° C.) and high pressure (360 psi) to obtain a copper-containing core.

Figure 2:
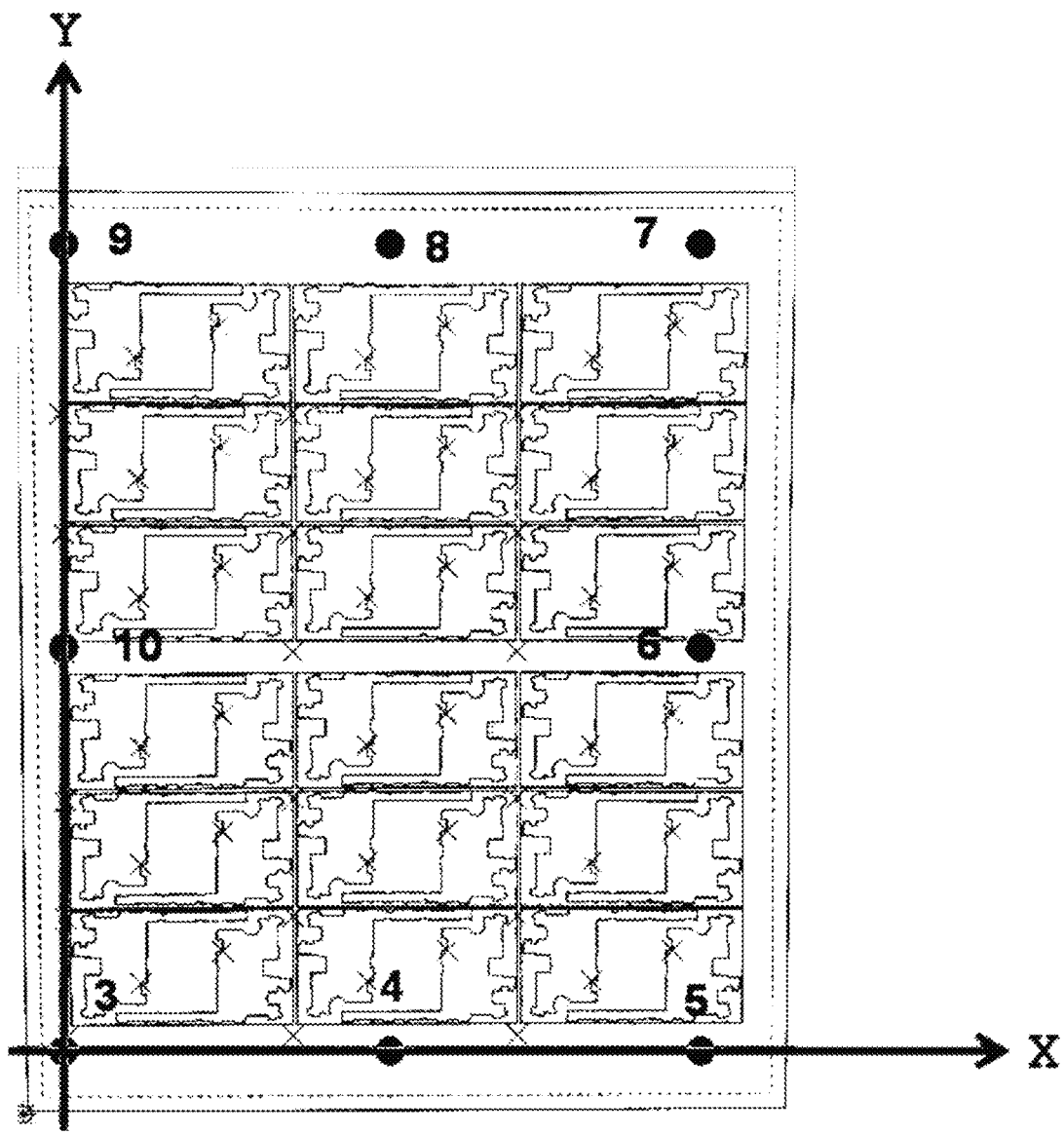
FIG. 2 illustrates a sample for dimensional stability test.

The copper-containing core was subject to conventional inner layer trace processes according to the Gerber Format Specification. First, the copper-containing core was treated by surface roughening on the copper foils by grinding and micro-etching, and then a photoresist dry film was tightly attached to the copper-containing core with proper temperature and pressure conditions. The core attached with the photoresist dry film was exposed in a UV exposure machine, during which the photoresist performed polymerization after UV radiation on the transparent area of the artwork (the dry film at the area was preserved as etching resist in the subsequent development and copper etching steps), so as to transfer the trace image on the artwork to the photoresist dry film. The artwork was measured as illustrated in FIG. 2, wherein point 3 is the origin, 3→5 represents a horizontal line, and the coordinate of each point was measured while controlling dimensional change and coordinate shift within a range of ±1 mil. The protective membrane on the film was torn down, and the area not subject to radiation on the film was removed by a sodium bicarbonate solution, followed by etching off the exposed copper foil with a mixture solution of hydrochloric acid and hydrogen peroxide so as to form traces. Then a sodium hydroxide solution was used to wash off the photoresist dry film to obtain an inner layer wiring board. The inner layer wiring board is punched by an automatic punching machine to form riveting reference holes for interlayer trace alignment. The inner layer wiring board was subject to a brown oxidation process to obtain a brown oxide treated inner layer wiring board.

A prepreg (prepared from each Example E1 to E13 and each Comparative Example C1 to C10 using 1027 E-glass fiber fabric, resin content of about 69%) was superimposed on both sides of the brown oxide treated inner layer wiring board, and the other side of each prepreg opposite to the brown oxide treated inner layer wiring board was covered with a piece of 0.5-ounce HTE copper foil. Prior to lamination, the brown oxide treated wiring board was measured with an X-ray coordinate measuring machine, wherein point 3 is the origin, 3→5 represents a horizontal line (X-direction), 3→9 represents a vertical line (Y-direction), and the coordinate of each point was measured, as illustrated in FIG. 2. The brown oxide treated wiring board was then subject to lamination and curing for 2 hours in vacuum at high temperature (200° C.) and high pressure (360 psi) to obtain a sample for dimensional stability test. 15 identical samples for dimensional stability test were tested in each dimensional stability test.

Figure 3:
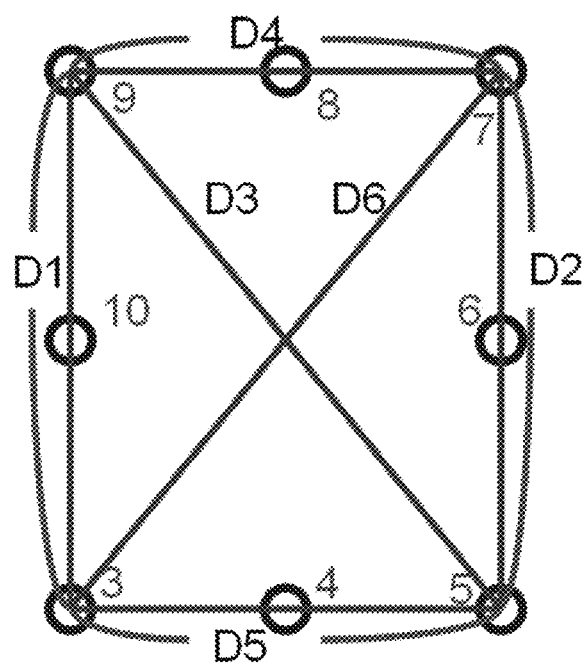
FIG. 3 and FIG. 4 illustrate the parameters involved in deformation Cpk calculations.
Figure 4:
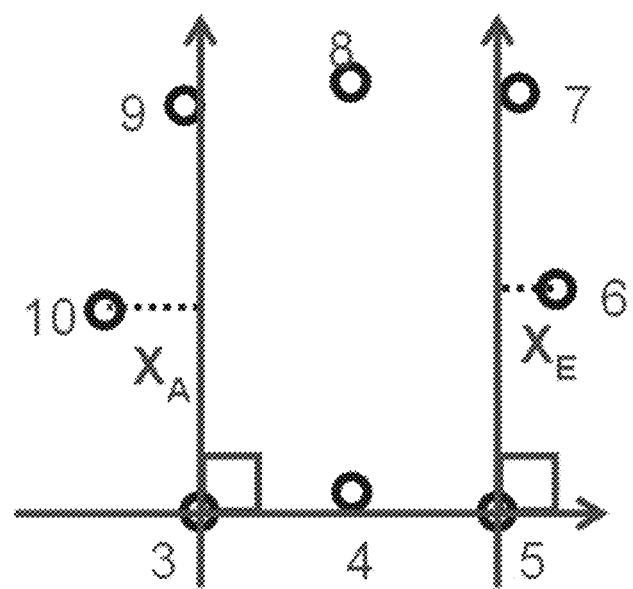

Each sample for dimensional stability test was measured with an X-ray coordinate measuring machine. The sample was placed on the measuring machine with its numbered positions located at the bottom right corner of the measuring machine, wherein point 3 is the origin, 3→5 represents a horizontal line, 3→9 represents a vertical line, and the coordinate of each point $(x_3,y_3)$, $(x_{10},y_{10})$ was measured. The length unit is mil. Coordinate $(x_3,y_3)$ is designated as (0,0). After the coordinate of each point was measured, the following calculations were performed in accordance with FIG. 3 (positions of the coordinate without dimensional change) and FIG. 4 (positions of the coordinate after dimensional change caused by lamination).

For each sample for dimensional stability test, $X_A$ (shift amount of point 10 at X-direction) and $X_E$ (shift amount of point 6 at X-direction) were measured, wherein: $X_A$=coordinate $(x_{10},y_{10})$–coordinate $(x_3,y_3)$, $X_E$=coordinate $(x_6,y_6)$–coordinate $(x_5,y_5)$;
the Mean value, i.e., the average of $X_A$ and $X_E$ of each sample, was calculated;
the Sigma value, i.e., the standard deviation of $X_A$ and $X_E$ of each sample, was calculated; and
the deformation Cpk was calculated as follows:

$Ca$=(Mean−middle of the specification)/(tolerance of the specification/2);

$Cp$=(tolerance of the specification)/(6*Sigma);

deformation $Cpk$=$Cp$*(1−$Ca$).

The middle of the specification is 0, and the tolerance of the specification is 3.7.

As understood by those having ordinary skill in the art, higher deformation Cpk represents higher dimensional stability of the sample tested, which also indicates better interlayer alignment of a multi-layer circuit board during lamination; a difference in deformation Cpk of greater than 0.10 (no unit) represents a significant difference.

Average Warpage Ratio

A core was prepared as follows: an EM-LX copper-containing laminate (available from Elite Material Co., Ltd., 3 mil in thickness, using 1078 E-glass fiber fabric and 0.5-ounce HTE copper foil) was subject to trace formation processes on the surface of copper foils, including such as exposure, lithography, etching, etc., to obtain a core.

The build-up process was performed on each Example and Comparative Example as follows: after obtaining the core, preparing a second prepreg from the epoxy resin composition of each Example and Comparative Example using 1067 E-glass fiber fabric; placing a second prepreg on both sides of the core and covering a 0.5-ounce HTE copper foil on the other side of the second prepreg opposite to the core, followed by lamination and curing in vacuum at high temperature (200° C.) and high pressure (360 psi) for 2 hours to complete the first lamination. After that, a drilling process was performed to make alignment holes, and then hole metallization process and trace formation process were performed to complete the first build-up step to obtain a four-layer board. The build-up processes were repeated to form a six-layer board (second build-up, second lamination), an eight-layer board (third build-up, third lamination), and finally a ten-layer board (fourth build-up, fourth lamination). The ten-layer board from each Example and Comparative Example (each having six samples) was cut to 35.36 cm in length, 35.36 in width, and 50 cm in diagonal, wherein the ten-layer board may be made according to known techniques.

The ten-layer board from each Example and Comparative Example cut to 35.36 cm in length, 35.36 in width, and 50 cm in diagonal of maximum plane was subject to the measurement of circuit board warpage property after one 260° C. reflow cycle by reference to the specification defined in IPC-TM-650 2.4.22 regarding twist. The sample was placed on a marble platform, and a height gauge was used to measure the vertical distance from one corner of the circuit board with maximum warpage to the plane defined by the other three corners as the warpage height. The warpage ratio is defined as: Warpage Ratio=(Warpage Height/Diagonal Length)*100%. Six samples were tested for each Example and Comparative Example in the average warpage ratio measurement.

The warpage height and warpage ratio of the six ten-layer boards for Example E1 and Comparative Example C1 are listed in Table 6, and the average warpage ratio of other Examples and Comparative Examples are listed in Table 1 to Table 5. As understood by those having ordinary skill in the art, lower average warpage ratio is better. A difference in average warpage ratio of greater than 0.10% represents a significant difference.

Copper Foil Peeling Strength (a.k.a. Peel Strength, P/S)

The copper-clad laminate (obtained by laminating five prepregs) was cut into a rectangular sample with a width of 24 mm and a length of greater than 60 mm, which was etched to remove surface copper foil to leave a rectangular copper foil with a width of 3.18 mm and a length of greater than 60 mm, and tested by using a tensile strength tester by reference to IPC-TM-650 2.4.8 at room temperature (about 25° C.) to measure the force (lb/in) required to separate the copper foil from the surface of the insulation layer. As understood by those having ordinary skill in the art, higher copper foil peeling strength is better. A difference in copper foil peeling strength of greater than 0.1 lb/in represents a significant difference.

Composition and test result of the epoxy resin compositions of all Examples and Comparative Examples are listed in Table 1 to Table 5.

TABLE 1

Composition (in equivalent) of epoxy resin and co-hardener in epoxy resin composition and test results of Examples

| Component | Name | E1 | E2 | E3 | E4 | E5 |
| --- | --- | --- | --- | --- | --- | --- |
| epoxy resin | NC-3000 | 0.357 | 0.357 | 0.357 | 0.357 | 0.357 |
| acid anhydride | EF-30 | 0.052 | 0.016 | 0.065 | 0.065 | 0.026 |
| polyester | HPC-8000 | 0.104 | 0.196 | 0.043 | 0.065 | 0.087 |
| first phenolic resin | HPC-9500 | 0.124 | 0.065 | 0.033 | 0.065 | 0.196 |
| second phenolic resin | PD-9110 | 0.105 | 0.079 | 0.211 | 0.158 | 0.053 |
| total equivalent of functional group of epoxy resin (A) | | 0.357 | 0.357 | 0.357 | 0.357 | 0.357 |

TABLE 1-continued

Composition (in equivalent) of epoxy resin and co-hardener in epoxy resin composition and test results of Examples

| | | | | | | |
|---|---|---|---|---|---|---|
| total equivalent of functional group of co-hardener (B) | 0.385 | 0.356 | 0.352 | 0.353 | 0.362 | |
| (B)/(A) | 1.08 | 1.00 | 0.99 | 0.99 | 1.01 | |

| Property | Unit | E1 | E2 | E3 | E4 | E5 |
|---|---|---|---|---|---|---|
| prepreg appearance | none | pass | pass | pass | pass | pass |
| inner resin flow | mm | 5.2 | 4.8 | 5.2 | 4.9 | 5.1 |
| resin filling property in open area | none | OK | OK | OK | OK | OK |
| dimensional stability (deformation Cpk) | none | 1.41 | 1.23 | 1.38 | 1.25 | 1.29 |
| average warpage ratio | % | 0.51 | 0.45 | 0.48 | 0.59 | 0.46 |
| P/S | lb/in | 6.2 | 6.1 | 6.4 | 6.0 | 6.5 |

TABLE 2

Composition (in equivalent) of epoxy resin and co-hardener in epoxy resin composition and test results of Examples

| Component | Name | E6 | E7 | E8 | E9 | E10 | E11 |
|---|---|---|---|---|---|---|---|
| epoxy resin | NC-3000 | 0.357 | 0.125 | 0.125 | 0.357 | 0.357 | 0.089 |
| | NPPN-260 | 0 | 0.050 | 0.050 | 0 | 0 | 0.050 |
| | N-740 | 0 | 0.028 | 0.028 | 0 | 0 | 0.056 |
| | HP-7200 | 0 | 0.109 | 0.109 | 0 | 0 | 0.145 |
| | HP-9500 | 0 | 0.087 | 0.087 | 0 | 0 | 0.065 |
| acid anhydride | EF-30 | 0.016 | 0.049 | 0.029 | 0.039 | 0.039 | 0.049 |
| | EF-60 | 0 | 0 | 0.020 | 0 | 0 | 0 |
| polyester | HPC-8000 | 0.109 | 0.087 | 0.043 | 0.070 | 0.061 | 0.135 |
| | HPC-8150 | 0 | 0 | 0.043 | 0 | 0 | 0 |
| first phenolic resin | HPC-9500 | 0.033 | 0.131 | 0.131 | 0.131 | 0.098 | 0.124 |
| second phenolic resin | PD-9110 | 0.074 | 0.105 | 0.105 | 0.105 | 0.105 | 0.058 |
| amine | DDS | 0.129 | 0 | 0 | 0.048 | 0 | 0 |
| total equivalent of functional group of epoxy resin (A) | | 0.357 | 0.399 | 0.399 | 0.357 | 0.357 | 0.405 |
| total equivalent of functional group of co-hardener (B) | | 0.361 | 0.372 | 0.371 | 0.393 | 0.303 | 0.366 |
| (B)/(A) | | 1.01 | 0.93 | 0.93 | 1.10 | 0.85 | 0.90 |

| Property | Unit | E6 | E7 | E8 | E9 | E10 | E11 |
|---|---|---|---|---|---|---|---|
| prepreg appearance | none | pass | pass | pass | pass | pass | pass |
| inner resin flow | mm | 4.9 | 5.2 | 5.1 | 5.1 | 4.6 | 5.0 |
| resin filling property in open area | none | OK | OK | OK | OK | OK | OK |
| dimensional stability (deformation Cpk) | none | 1.26 | 1.24 | 1.24 | 1.31 | 1.23 | 1.25 |
| average warpage ratio | % | 0.43 | 0.48 | 0.47 | 0.49 | 0.58 | 0.49 |
| P/S | lb/in | 6.3 | 6.5 | 6.4 | 6.3 | 6.1 | 6.4 |

TABLE 3

Composition (in equivalent) of epoxy resin and co-hardener in epoxy resin composition and test results of Examples

| Component | Name | E12 | E13 |
|---|---|---|---|
| epoxy resin | NC-3000 | 0.357 | 0.357 |
| acid anhydride | EF-30 | 0.049 | 0.049 |
| polyester | HPC-8000 | 0.087 | 0.087 |
| first phenolic resin | HPC-9500 | 0.131 | 0.131 |
| second phenolic resin | PD-9110 | 0.105 | 0.105 |
| maleimide | BMI-2300 | 0.011 | 0 |
| vinyl-containing PPE | SA-9000 | 0 | 0.0062 |
| | OPE-2st 1200 | 0.0086 | 0.0052 |

TABLE 3-continued

Composition (in equivalent) of epoxy resin and co-hardener in epoxy resin composition and test results of Examples

| | | |
|---|---|---|
| total equivalent of functional group of epoxy resin (A) | 0.357 | 0.357 |
| total equivalent of functional group of co-hardener (B) | 0.392 | 0.383 |
| (B)/(A) | 1.10 | 1.07 |

| Property | Unit | E12 | E13 |
|---|---|---|---|
| prepreg appearance | none | pass | pass |
| inner resin flow | mm | 4.7 | 4.6 |
| resin filling property in open area | none | OK | OK |
| dimensional stability (deformation Cpk) | none | 1.27 | 1.23 |
| average warpage ratio | % | 0.51 | 0.59 |
| P/S | lb/in | 6.4 | 6.5 |

TABLE 4

Composition (in equivalent) of epoxy resin and co-hardener in epoxy resin composition and test results of Comparative Examples

| Component | Name | C1 | C2 | C3 | C4 | C5 |
|---|---|---|---|---|---|---|
| epoxy resin | NC-3000 | 0.357 | 0.357 | 0.357 | 0.357 | 0.357 |
| acid anhydride | EF-30 | 0 | 0 | 0.163 | 0.131 | 0.065 |
| polyester | HPC-8000 | 0.065 | 0.065 | 0 | 0 | 0.065 |
| first phenolic resin | HPC-9500 | 0.065 | 0.163 | 0.065 | 0.098 | 0 |

TABLE 4-continued

Composition (in equivalent) of epoxy resin and co-hardener in epoxy resin composition and test results of Comparative Examples

| | | | | | | |
|---|---|---|---|---|---|---|
| second phenolic resin | PD-9110 | 0.211 | 0.158 | 0.074 | 0.158 | 0.158 |
| total equivalent of functional group of epoxy resin (A) | | 0.357 | 0.357 | 0.357 | 0.357 | 0.357 |
| total equivalent of functional group of co-hardener (B) | | 0.341 | 0.386 | 0.302 | 0.387 | 0.288 |
| (B)/(A) | | 0.96 | 1.08 | 0.85 | 1.08 | 0.81 |

| Property | Unit | C1 | C2 | C3 | C4 | C5 |
|---|---|---|---|---|---|---|
| prepreg appearance | none | pass | pass | fail | fail | pass |
| inner resin flow | mm | 5.2 | 5.1 | 2.0 | 2.3 | 4.6 |
| resin filling property in open area | none | OK | OK | ** | ** | OK |
| dimensional stability (deformation Cpk) | none | 0.77 | 0.68 | 0.85 | 1.04 | 0.71 |
| average warpage ratio | % | 1.12 | 1.54 | 0.77 | 0.73 | 1.47 |
| P/S | lb/in | 6.1 | 6.2 | 4.2 | 4.6 | 5.3 |

TABLE 5

Composition (in equivalent) of epoxy resin and co-hardener in epoxy resin composition and test results of Comparative Examples

| Component | Name | C6 | C7 | C8 | C9 | C10 |
|---|---|---|---|---|---|---|
| epoxy resin | NC-3000 | 0.357 | 0.357 | 0.357 | 0.357 | 0.357 |
| acid anhydride | EF-30 | 0.124 | 0.033 | 0.059 | 0.163 | 0 |
| polyester | HPC-8000 | 0.130 | 0.065 | 0.130 | 0 | 0.174 |
| first phenolic resin | HPC-9500 | 0 | 0.131 | 0.196 | 0.222 | 0 |
| second phenolic resin | PD-9110 | 0.132 | 0 | 0 | 0 | 0.211 |
| total equivalent of functional group of epoxy resin (A) | | 0.357 | 0.357 | 0.357 | 0.357 | 0.357 |
| total equivalent of functional group of co-hardener (B) | | 0.386 | 0.229 | 0.385 | 0.385 | 0.385 |
| (B)/(A) | | 1.08 | 0.64 | 1.08 | 1.08 | 1.08 |

| Property | Unit | C6 | C7 | C8 | C9 | C10 |
|---|---|---|---|---|---|---|
| prepreg appearance | none | fail | pass | pass | fail | pass |
| inner resin flow | mm | 4.2 | 3.2 | 3.3 | 2.1 | 5.0 |
| resin filling property in open area | none | OK | * | * | ** | OK |
| dimensional stability (deformation Cpk) | none | 0.85 | 1.01 | 1.11 | 0.55 | 0.67 |
| average warpage ratio | % | 1.63 | 0.67 | 0.64 | 0.59 | 1.64 |
| P/S | lb/in | 4.4 | 5.5 | 5.3 | 3.8 | 5.6 |

TABLE 6

Results of warpage test of Example E1 and Comparative Example C1

| | Maximum warpage height (cm) | Average warpage height (cm) | Warpage ratio (%) | Average warpage ratio (%) |
|---|---|---|---|---|
| Example E1 | 0.16 | 0.25 | 0.32 | 0.51 |
| | 0.25 | | 0.50 | |
| | 0.36 | | 0.72 | |
| | 0.31 | | 0.62 | |
| | 0.23 | | 0.46 | |
| | 0.21 | | 0.42 | |
| Comparative Example C1 | 0.43 | 0.56 | 0.86 | 1.12 |
| | 0.52 | | 1.04 | |
| | 0.31 | | 0.62 | |
| | 0.66 | | 1.32 | |
| | 0.78 | | 1.56 | |
| | 0.66 | | 1.32 | |

In Example E1, if the equivalent of epoxy group of the epoxy resin is scaled up from 0.357 to 1 equivalent, the equivalent (rounded off) of each co-hardener scaled in proportion will be: equivalent of acid anhydride group is 0.146; equivalent of ester group is 0.291; equivalent of hydroxyl group of the first phenolic resin is 0.347; and equivalent of hydroxyl group of the second phenolic resin is 0.294. Similarly, the equivalent of each co-hardener and the total equivalent of functional groups of the co-hardener when the total equivalent of epoxy group of the epoxy resin composition is scaled up to 1 can be calculated as above for Examples E2 to E13 and Comparative Examples C1 to C10.

The following observations can be made according to the test results above.

When the total equivalent of epoxy group of the epoxy resin composition in Examples E1 to E13 is 1, the acid anhydride has a total equivalent of acid anhydride group of 0.044-0.183, the polyester has a total equivalent of ester group of 0.120-0.550, the first phenolic resin has an equivalent of hydroxyl group of 0.092-0.550, the second phenolic resin has an equivalent of hydroxyl group of 0.143-0.592, and the ratio of the total equivalent of functional groups of the co-hardener to the total equivalent of epoxy group of the epoxy resin is 0.84-1.11. In contrast, when the total equivalent of epoxy group of the epoxy resin composition in Comparative Examples C1 to C10 is 1, at least one or more of the total equivalent of acid anhydride group, the total equivalent of ester group, the equivalent of hydroxyl group of the first phenolic resin and the equivalent of hydroxyl group of the second phenolic resin do not satisfy the ranges recited above.

From the comparison of Examples E1 to E5 and Comparative Examples C1 to C10, the following observations can be made. Given that the total equivalent of epoxy group of the epoxy resin composition in Examples E1 to E5 is 1, and that all of the total equivalent of acid anhydride group, the total equivalent of ester group, the equivalent of hydroxyl group of the first phenolic resin and the equivalent of hydroxyl group of the second phenolic resin fall within the ranges described above, the prepreg made therefrom is absent of void of greater than 1 mm in diameter, the prepreg has an inner resin flow after lamination of greater than or equal to 4.5 mm, the sample is absent of void in the open area and has an excellent resin filling property, the copper-clad laminate made therefrom has a dimensional stability (deformation Cpk) of greater than or equal to 1.20, the ten-layer board has an average warpage ratio of less than or equal to 0.60%, and the copper-clad laminate has a copper foil peeling strength of greater than or equal to 6.0 lb/in. In contrast, Comparative Examples C1 to C10 fail to meet at least one or more of the aforesaid properties.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. An epoxy resin composition, comprising an epoxy resin and a co-hardener, wherein:
   relative to the epoxy resin having a total equivalent of epoxy group of 1, the co-hardener comprises: (A) an acid anhydride having a total equivalent of acid anhydride group of 0.044-0.183; (B) a polyester having a total equivalent of ester group of 0.120-0.550; (C) a first phenolic resin having an equivalent of hydroxyl group of 0.092-0.550; and (D) a second phenolic resin having an equivalent of hydroxyl group of 0.143-0.592; and
   a sum of equivalent of functional groups of the co-hardener is 0.84-1.11.

2. The epoxy resin composition of claim 1, further comprising: amine curing agent, maleimide resin, acrylate resin, benzoxazine resin, cyanate ester resin, polyolefin resin, vinyl-containing polyphenylene ether resin, triallyl isocyanurate resin, triallyl cyanurate resin or a combination thereof.

3. The epoxy resin composition of claim 1, further comprising: flame retardant, inorganic filler, curing accelerator, solvent, toughening agent, silane coupling agent or a combination thereof.

4. An article made from the epoxy resin composition of claim 1, comprising a resin film, a prepreg, a laminate or a printed circuit board.

5. The article of claim 4, characterized by absence of void of greater than 1 mm in diameter by visual inspection.

6. The article of claim 4, characterized by having an inner resin flow after lamination of greater than or equal to 4.5 mm.

7. The article of claim 4, characterized by absence of void of greater than 1 mm in diameter in an open area after resin filling.

8. The article of claim 4, characterized by having a dimensional stability after lamination represented by deformation Cpk of greater than or equal to 1.20.

9. The article of claim 4, characterized by having an average warpage ratio as measured by reference to IPC-TM-650 2.4.22 of less than or equal to 0.60%.

10. The article of claim 4, characterized by having a copper foil peeling strength as measured by reference to IPC-TM-650 2.4.8 of greater than or equal to 6.0 lb/in.

* * * * *